United States Patent [19]

Patron et al.

[11] Patent Number: 5,474,696
[45] Date of Patent: Dec. 12, 1995

[54] PROCESS FOR REFRIGERATION USING 1,1,1,2-TETRAFLUORO-2-(DIFLUOROMETHOXY) ETHANE OR 1,1,2,2-TETRAFLUORO-2-(DIFLUOROMETHOXY)ETHANE

[75] Inventors: Donna M. Patron, Newark, Del.; Allen C. Sievert, Elkton, Md.

[73] Assignee: E. I. Du Pont de Nemours and Company, Wilmington, Del.

[21] Appl. No.: 338,831

[22] Filed: Nov. 10, 1994

Related U.S. Application Data

[63] Continuation of Ser. No. 8,263, Jan. 25, 1993, abandoned, which is a continuation of Ser. No. 758,269, Aug. 27, 1991, abandoned.

[51] Int. Cl.$^6$ ............................................. C09K 5/04
[52] U.S. Cl. ................................. 252/67; 62/114
[58] Field of Search ........................ 252/67; 62/114

[56] References Cited

U.S. PATENT DOCUMENTS

| | | | |
|---|---|---|---|
| 3,362,180 | 1/1968 | Eiseman, Jr. | 252/67 |
| 3,394,878 | 7/1968 | Eiseman | 252/67 |
| 3,409,555 | 11/1968 | Eiseman | 252/67 |
| 4,541,943 | 9/1985 | Powell | 252/67 |
| 4,559,154 | 12/1985 | Powell | 252/69 |
| 4,762,856 | 8/1988 | Terrell | 514/722 |
| 4,961,321 | 10/1990 | O'Neill et al. | 252/67 |
| 4,985,169 | 1/1991 | Rolland et al. | 252/69 |
| 5,023,009 | 6/1991 | Merchant | 252/171 |

FOREIGN PATENT DOCUMENTS

| | | |
|---|---|---|
| 0127365 | 12/1984 | European Pat. Off. . |
| 0388114 | 9/1990 | European Pat. Off. . |

OTHER PUBLICATIONS

McLinden et al, "Quest for Alternatives", ASHRAE Journal, Dec. 1987.

*Journal of Medicinal Chemistry*, 1972, vol. 15, No. 6, by Terrell et al., pp. 604–606, "General Anesthetics. 3. Fluorinated Methyl Ethyl Ethers as Anesthetic Agents".

International Search Report regarding international application No. PCT/US92/06973 with an international filing date of Aug. 25, 1992.

*Primary Examiner*—Christine Skane

[57] ABSTRACT

Producing refrigeration by evaporating the fluorocarbon refrigerants 1,1,1,2- and 1,1,2,2-tetrafluoro-2-(difluoromethoxy)ethane in the vicinity of a body to be cooled.

3 Claims, No Drawings

PROCESS FOR REFRIGERATION USING 1,1,1,2-TETRAFLUORO-2-(DIFLUOROMETHOXY) ETHANE OR 1,1,2,2-TETRAFLUORO-2-(DIFLUOROMETHOXY)ETHANE

This is a continuation of application Ser. No. 08/008,263 filed on Jan. 25, 1993, now abandoned, which is a continuation of patent application Ser. No. 07/758,269 on Aug. 27, 1991, abandoned.

BACKGROUND OF THE INVENTION

The present invention relates to a process for refrigeration using a chlorine-free fluorocarbon refrigerant.

A refrigeration system is designed to produce a cooling effect and is used for air conditioning buildings and in the treatment transportation and preservation of foods. During a refrigeration cycle the refrigerant undergoes a physical change resulting in a cooling effect, for example, a change from the liquid state to the vapor state. A simple refrigeration system is generally closed and consists of four major components, namely an evaporator, a compressor, a condenser and an expansion device. During the refrigeration cycle the refrigerant in liquid form leaves the condenser and passes through the expansion device where the pressure is lowered. The refrigerant passes into the evaporator where heat is absorbed and the refrigerant evaporates. The refrigerant leaves the evaporator as vapor and enters the compressor where it is compressed to a superheated vapor before passing into the condenser to complete the cycle, which is repeated continuously.

The most widely used refrigerants are known as chlorofluorocarbons (CFCs). These compounds are fully halogenated, very stable, have low toxicity and excellent thermodynamic performance in use. Unfortunately, CFCs, because of their stability, have long atmospheric lifetimes. It has been postulated that when these materials decompose in the stratosphere, under the influence of ultraviolet radiation, they release chlorine atoms which, it is theorized, react with the ozone thus depleting this protective layer which shields the earth from harmful ultraviolet radiation.

There is a need for fluorocarbon refrigerants that are substantially chlorine-free and environmentally safe, non-flammable, have low toxicity and excellent thermodynamic properties, especially its refrigeration capacity at a given evaporator temperature, and a high coefficient of performance.

SUMMARY OF THE INVENTION

The present invention is directed to a process for producing refrigeration which comprises condensing a chlorine-free fluorocarbon refrigerant selected from the group consisting of 1,1,1,2-tetrafluoro-2-(difluoromethoxy)ethane ($CHF_2OCHFCF_3$), and 1,1,2,2-tetrafluoro-2-(difluoromethoxy)ethane ($CHF_2OCF_2CHF_2$), and thereafter evaporating the fluorocarbon refrigerant in the vicinity of a body to be cooled. The chlorine-free fluorocarbons are environmentally safe while, at the same time, they show excellent thermodynamic properties when measured against commercially successful refrigerants.

DESCRIPTION OF PREFERRED EMBODIMENTS

The chlorine-free fluorocarbon refrigerants used in the process of the invention are 1,1,1,2-tetrafluoro-2-(difluoromethoxy)ethane and 1,1,2,2-tetrafluoro-2-(difluoromethoxy)ethane. The procedure for preparing the fluorocarbon refrigerants of the present invention are known in the art. 1,1,1,2-Tetrafluoro-2-(difluoromethoxy)ethane can be prepared by reacting isoflurane ($CHF_2OCHClF_3$) with hydrogen fluoride in the presence of an antimony pentachloride catalyst wherein the molar ratio of isoflurane to hydrogen fluoride is about 1:2, as disclosed in European Patent Application 388,114. 1,1,2,2-Tetrafluoro-2-(difluoromethoxy)ethane can be prepared by chlorinating $CH_3OCF_2CHF_2$ to $CHCl_2OCF_2CHF_2$ followed by the exchange of chlorine for fluorine, as described in Terrell et al., *J. Med. Chem.*, Vol. 15, pp. 604–606 (1972). 1,1,2,2-Tetrafluoro-2-(difluoromethoxy)ethane can also be prepared by electrochemical fluorination of $CHCl_2OCF_2CHClF$ as described by Okazaki et al., *J. Fluorine Chem.* Vol. 4, pp. 387–397 (1974).

The process of the present invention involves transferring heat in a refrigeration cycle by repeatedly evaporating, compressing and condensing in a closed system the chlorine-free fluorocarbons 1,1,1,2- and 1,1,2,2-tetrafluoro-2-(difluoromethoxy)ethane.

The fluorocarbon refrigerant 1,1,1,2-tetrafluoro-2-(difluoromethoxy)ethane is reported to have a boiling point at 23.5° C. The fluorocarbon refrigerant 1,1,2,2-tetrafluoro-2-(difluoromethoxy)ethane has a boiling point at atmospheric pressure of 28.5° C.

Additional chlorine-free fluorocarbon refrigerants can be added to the fluorocarbon refrigerants in varying amounts, for example, to improve thermodynamic properties of the mixture or to incorporate the fluorocarbons composition of the present invention with flammable mixtures to lower their flammability. Such refrigerants include hydrofluoroalkanes, hydrofluoroethers, cyclic hydrofluoroalkanes, cyclic hydrofluoroethers. The addition of such other ingredients does not detract from the benefits of the chlorine-free fluorocarbons used in the present invention.

The advantages of the invention can be seen when 1,1,1,2-tetrafluoro-2-(difluoromethoxy)ethane ($CHF_2OCHFCF_3$) and 1,1,2,2-tetrafluoro-2-(difluoromethoxy)ethane ($CHF_2OCF_2CHF_2$) are compared with the performance of the commercially successful refrigerant trichlorofluoromethane (CFC-11) in regard to coefficient of performance and capacity as illustrated in Table I below.

TABLE I

| | CFC-11 | ($CHF_2OCHFCF_3$) | ($CHF_2OCF_2CHF_2$) |
|---|---|---|---|
| Evaporator Temp., °F. | 40 | 40 | 40 |
| Evaporator Pressure, psia | 7.11 | 6.79 | 5.44 |
| Condenser Temp., °F. | 100 | 100 | 100 |
| Condenser Pressure, psia | 23.53 | 24.85 | 20.54 |
| Return Gas Temp., °F. | 60 | 60 | 60 |
| Compressor Discharge Temp., °F. | 131.2 | 105.2 | 109.6 |
| Coefficient of Performance | 7.27 | 6.79 | 6.93 |
| Capacity - | 42.37 | 39.7 | 33.5 |

TABLE I-continued

| | CFC-11 | $(CHF_2OCHFCF_3)$ | $(CHF_2OCF_2CHF_2)$ |
|---|---|---|---|
| BTU/min. Vapor Pressure at 25° C., psia | 15.4 | 15.7 | 12.9 |
| Impeller Tip Speed, m/s | 132.8 | 151.0 | 151.8 |

The coefficient of performance is the ratio of the capacity to the compressor work. It measures refrigerant energy efficiency.

Capacity means the change in enthalpy of the refrigerant in the evaporator per pound of refrigerant circulated, i.e., the heat removed by the refrigerant in the evaporator per time.

Impeller tip speed means the speed needed to compress a refrigerant from saturated vapor at 40° F. to a pressure corresponding to a condensing temperature of 100° F.

The coefficient of performance and capacity for the chlorine-free fluorocarbons of this invention are compared to CFC-11 in Table I above. It can be seen that the capacity and coefficient of performance values for the environmentally safe chlorine-free fluorocarbon refrigerants are comparable to those for the commercially successful refrigerant CFC-11.

We claim:

1. A process for producing refrigeration which comprises condensing a chlorine-free fluorocarbon refrigerant selected from the group consisting of 1,1,1,2-tetrafluoro-2-(difluoromethoxy)ethane and 1,1,2,2-tetrafluoro-2-(difluoromethoxy)ethane, and thereafter evaporating the fluorocarbon refrigerant in the vicinity of a body to be cooled.

2. A process of claim 1 wherein the fluorocarbon refrigerant is 1,1,1,2-tetrafluoro-2-(difluoromethoxy)ethane.

3. A process of claim 1 wherein the fluorocarbon refrigerant is 1,1,2,2-tetrafluoro-2-(difluoromethoxy)ethane.

* * * * *